United States Patent
Bostick et al.

(10) Patent No.: US 9,921,740 B2
(45) Date of Patent: Mar. 20, 2018

(54) DYNAMIC CONTENT ALIGNMENT IN TOUCH SCREEN DEVICE

(71) Applicant: International Business Machines Corporation, Armonk, NY (US)

(72) Inventors: James E. Bostick, Cedar Park, TX (US); John M. Ganci, Jr., Cary, NC (US); Sarbajit K. Rakshit, Kolkata (IN); Craig M. Trim, Sylmar, CA (US)

(73) Assignee: International Business Machines Corporation, Armonk, NY (US)

( * ) Notice: Subject to any disclaimer, the term of this patent is extended or adjusted under 35 U.S.C. 154(b) by 196 days.

(21) Appl. No.: 14/621,911

(22) Filed: Feb. 13, 2015

(65) Prior Publication Data

US 2016/0240173 A1   Aug. 18, 2016

(51) Int. Cl.
| | |
|---|---|
| G06F 3/0488 | (2013.01) |
| G09G 3/20 | (2006.01) |
| G09G 5/38 | (2006.01) |
| G09G 5/373 | (2006.01) |
| G06F 3/041 | (2006.01) |

(52) U.S. Cl.
CPC ............ *G06F 3/0488* (2013.01); *G09G 3/20* (2013.01); *G09G 2320/0693* (2013.01); *G09G 2340/045* (2013.01); *G09G 2340/14* (2013.01); *G09G 2370/16* (2013.01); *G09G 2380/02* (2013.01); *G09G 2380/14* (2013.01)

(58) Field of Classification Search
CPC ............ G06F 3/04883; G06F 3/04845; G06F 3/0416; G09G 2340/0464; G09G 2340/14; G09G 2380/14; G09G 3/20; G09G 5/373; G09G 5/38; G09G 2370/16
USPC .................................................. 345/173, 649
See application file for complete search history.

(56) References Cited

U.S. PATENT DOCUMENTS

| | | | |
|---|---|---|---|
| 7,710,390 B2 * | 5/2010 | Tokkonen | G06F 3/0488 178/18.01 |
| 8,482,535 B2 | 7/2013 | Pryor | |
| 8,531,410 B2 | 9/2013 | Roth et al. | |
| 2001/0055020 A1 * | 12/2001 | Hertzfeld | G06F 17/214 345/472 |
| 2009/0002326 A1 * | 1/2009 | Pihlaja | G06F 3/04812 345/173 |
| 2010/0066763 A1 * | 3/2010 | MacDougall | G06F 1/1626 345/656 |
| 2011/0202835 A1 * | 8/2011 | Jakobsson | G06F 3/0481 715/702 |
| 2012/0032979 A1 * | 2/2012 | Blow | G06F 1/1626 345/647 |
| 2013/0285922 A1 | 10/2013 | Alberth, Jr. et al. | |
| 2014/0071043 A1 * | 3/2014 | Jung | G06F 3/03 345/156 |
| 2014/0362090 A1 * | 12/2014 | Langoulant | G06F 3/04812 345/467 |

* cited by examiner

*Primary Examiner* — Gregory J Tryder
*Assistant Examiner* — Michael Le
(74) *Attorney, Agent, or Firm* — Lisa Ulrich; Hoffman Warnick LLC

(57) ABSTRACT

Methods, computer program products and systems for displaying content on a touch screen of a touch screen device. One method includes: obtaining data indicating a portion of the touch screen is obstructed during display of the content on the touch screen; and adjusting a position of the content as displayed on the touch screen in response to obtaining the data indicating the portion of the touch screen is obstructed.

4 Claims, 7 Drawing Sheets

US 9,921,740 B2

DYNAMIC CONTENT ALIGNMENT IN TOUCH SCREEN DEVICE

TECHNICAL FIELD

Aspects of the invention relate generally to displaying content. More particularly, various aspects of the invention relate to displaying content on touch screen devices.

BACKGROUND

Conventional touch screen displays are configured to align or realign based upon directional rotation of the device upon which the touch screen resides. For example, a smartphone, tablet, or other touch screen, may rotate its screen display in response to a user rotating the device. However, the conventional realignment approaches fail to account for obstructions or other viewing-related obstacles which hinder the user's interaction with the device.

BRIEF SUMMARY

Methods, computer program products and systems for displaying content on a touch screen of a touch screen device. One method includes: obtaining data indicating a portion of the touch screen is obstructed during display of the content on the touch screen; and adjusting a position of the content as displayed on the touch screen in response to obtaining the data indicating the portion of the touch screen is obstructed.

A first aspect includes a method for displaying content on a touch screen of a touch screen device. One method includes: obtaining data indicating a portion of the touch screen is obstructed during display of the content on the touch screen; and adjusting a position of the content as displayed on the touch screen in response to obtaining the data indicating the portion of the touch screen is obstructed.

A second aspect includes a system having at least one computing device configured to display content on a touch screen of a touch screen device by performing actions including: obtaining data indicating a portion of the touch screen is contacted during display of the content on the touch screen; and adjusting a position of the content as displayed on the touch screen in response to obtaining the data indicating the portion of the touch screen is contacted.

A third aspect includes a system having: at least one computing device configured to display content on a touch screen of a touch screen device by performing actions including: obtaining data indicating a portion of the touch screen is obstructed during display of the content on the touch screen; and adjusting a position of the content as displayed on the touch screen in response to obtaining the data indicating the portion of the touch screen is obstructed.

Figure 1:
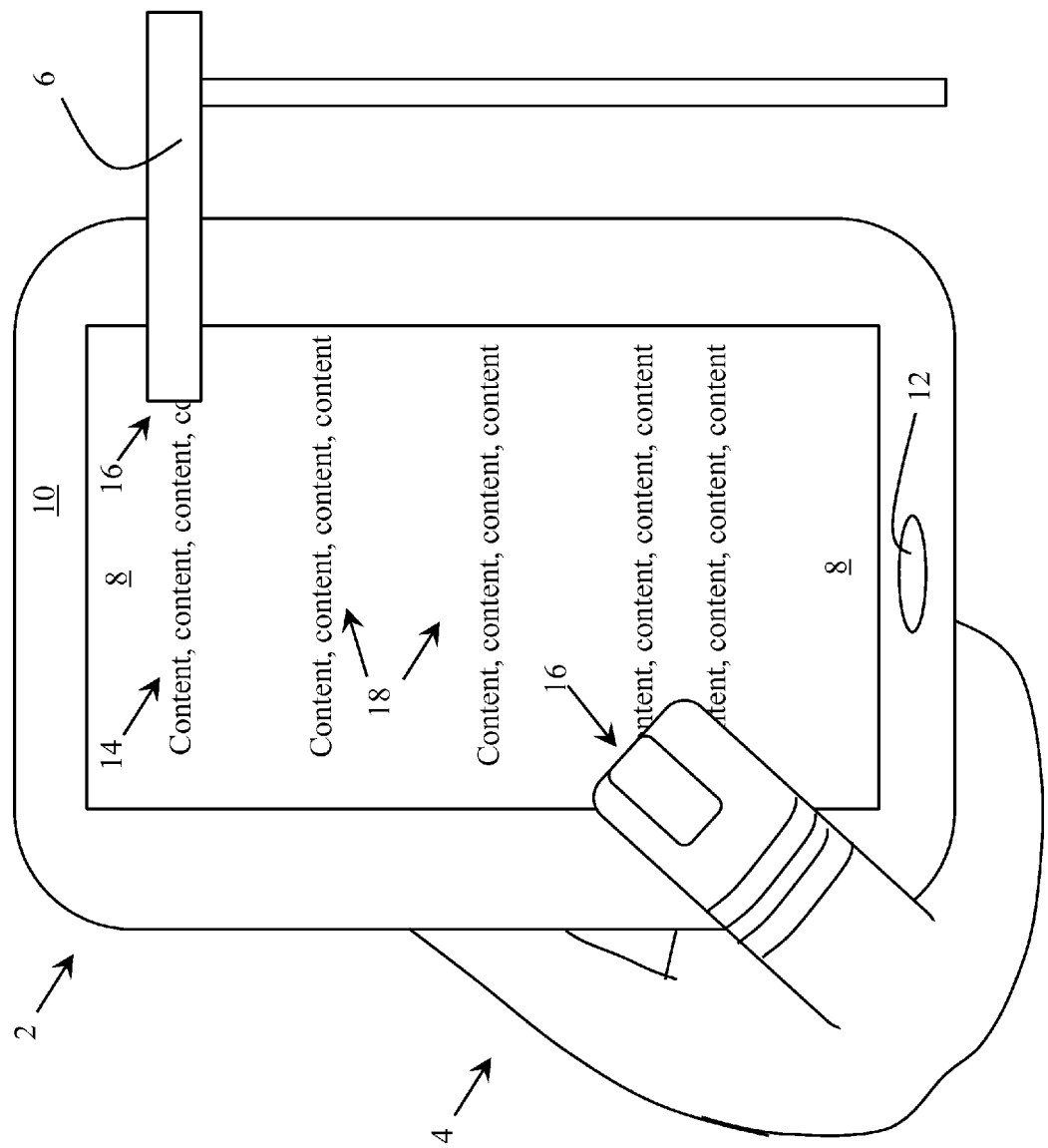
FIG. 1 shows a schematic depiction of a touch screen device according to various embodiments.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION

As noted herein, various aspects of the disclosure relate generally to content displays. More particularly, various aspects of the invention relate to dynamically aligning content on a touch screen device based upon user interaction with the device.

Commonly labeled components in the FIGURES are considered to be substantially equivalent components for the purposes of illustration, and redundant discussion of those components is omitted for clarity.

Various embodiments of the disclosure include approaches for dynamically aligning content on a touch screen, based upon user interaction with the touch screen, e.g., based upon a user's hand position, viewing angle, and/or flexion of the touch screen. These approaches go beyond the conventional rotational alignment in touch screen devices, and can enhance the viewing experience for the user. In particular embodiments, content is realigned on a touch screen display based upon a detected position of the user's hand, (e.g., a thumb or finger(s)) and/or other holding device contacting the touch screen. In these embodiments, content can be redirected on the display screen (e.g., shifted) around the area where the user's hand (e.g., thumb, finger(s)) and/or the holding device contacts the touch screen, based upon detection of that portion of the hand and/or holding device. In other embodiments, where the underlying format of the content is not editable (e.g., such as a PDF format which cannot be altered), approaches may zoom (either in or out) to make content viewable around the portion of the user's hand and/or the holding device which contacts the touch screen. In still other embodiments, where the touch screen is part of a flexible-display device (e.g., a flexible, electronic paper screen), approaches can include detecting that the flexible display is in flexion, and realigning the content to enhance the viewing angle based upon that flexion. For example, where an electronic paper device is bent, in either a concave or a convex manner, aspects include shifting the display content to a portion of the electronic paper which is in less than a threshold percentage of flexion.

FIG. 1 shows a schematic illustration of a touch screen device 2, and a user's hand 4 contacting (e.g., holding) the touch screen device 2. Additionally shown in FIG. 1 is a holding device 6, which is also contacting (holding) the touch screen device 2. The touch screen device 2 can include any conventional device having a touch screen, e.g., a smartphone, a tablet, a personal computing device, a personal data assistant, a table-top computing device, a wall-mounted computing device, etc. That is, the touch screen device 2 described according to various embodiments can include any device (e.g., electronic device) having a touch screen that is capable of being obstructed from line of view, such as by a human hand, holding device, etc. In various embodiments, the touch screen device 2 can include a touch screen 8, and a housing (or border) 10 which may at least partially surround, encase, or hold the touch screen 8. The touch screen device 2 in some embodiments can include actuatable buttons, e.g., such as button 12. In various embodiments, as described herein, a portion of the touch screen 8 can display content 14, as shown in FIG. 1. In various embodiments, content 14 can include text, images, video, etc. In various particular embodiments, content 14 can include text, e.g., email text, HTML text, PDF text, etc.

As shown in FIG. 1, at least a portion 16 of content 14 is obstructed from view, in this case, by the user's hand 4 and the holding device 6. In some cases, one or more portions 16 of touch screen 8 are obstructed from view, e.g., from the view of one or more users, viewers, etc. A distinct portion 18 is not obstructed from view, or substantially unobstructed from view. Approaches according to various embodiments of the disclosure adjust a position of the content 14 on the touch screen 8 such that the portion of the content 14 in the obstructed portion 16 of the touch screen 8 is viewable, e.g., by one or more users, in response to detecting the obstruction (e.g., user's hand 4 and/or holding device 6). In particular embodiments, the touch screen 8 and/or the housing 10 is coupled with a pressure sensor 150 (FIG. 3) which can detect that the obstruction is contacting the touch screen 8, and a computing device (computing system 120) (FIG. 3) coupled with the pressure sensor 150 and the touch screen 8 to obtain data (e.g., from pressure sensor 150) that a portion 16 of the touch screen 8 is obstructed, and adjust a position of the content 14 as displayed on the touch screen 8 in response to obtaining that data.

Figure 2:
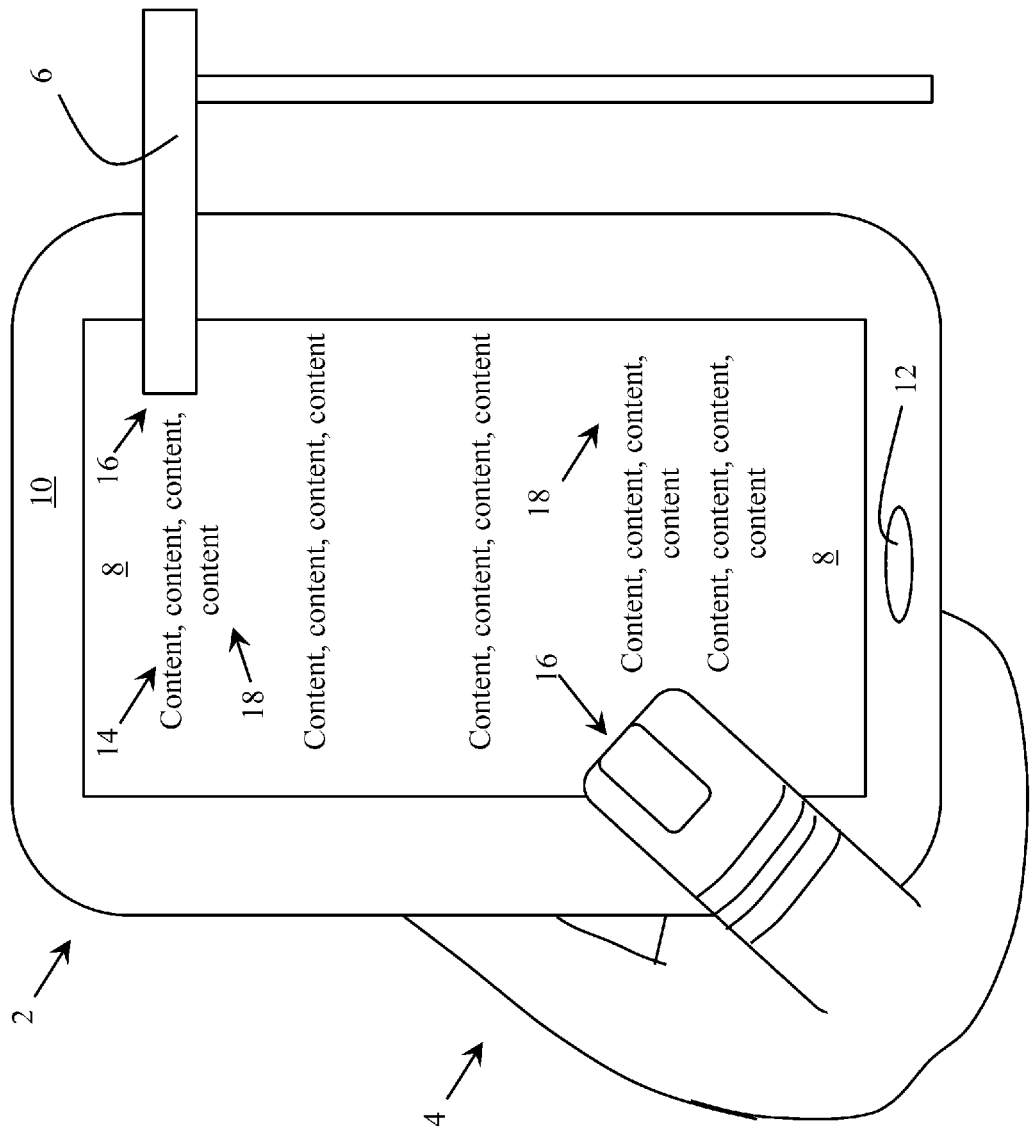
FIG. 2 shows a schematic depiction of the touch screen device of FIG. 1, with display altered according to various embodiments of the disclosure.

FIG. 2 shows a schematic depiction of the touch screen device 2, illustrating the result of a method performed according to various embodiments, which when compared with FIG. 1, shows that the position of content 14 has been adjusted in order to display content 14 in the unobstructed portions 18 of the touch screen 8, and not display content 14 in the obstructed portion 16.

Figure 3:
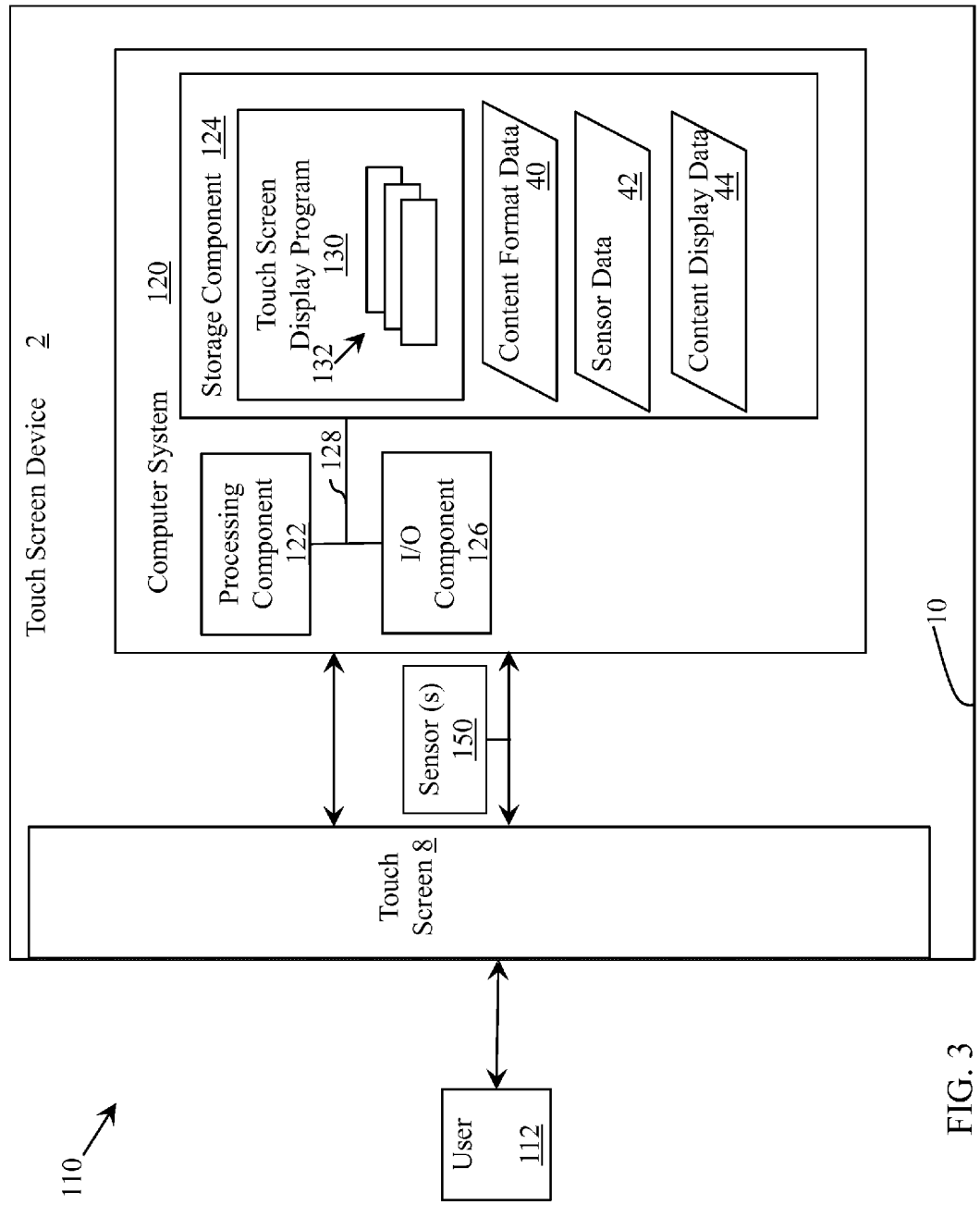
FIG. 3 illustrates an environment including a touch screen display program and the touch screen device of FIGS. 1-2, according to various embodiments of the disclosure.

FIG. 3 shows an illustrative environment 110 for performing automatic question generation functions according to an embodiment of the invention. To this extent, environment 110 includes the touch screen device 2, which can include a computer system 120 that can perform a process described herein in order to display content on a touch screen (e.g., touch screen 8, FIGS. 1-2). In particular, computer system 120 is shown including a touch screen display program 130, which makes computer system 120 operable to display content on a touch screen (e.g., touch screen 8) by performing processes described herein. According to various embodiments, the computer system 120 is contained within the touch screen device 2, for example, within the housing 10 (FIGS. 1-2), as is known in the art.

Computer system 120 is shown including a processing component 122 (e.g., one or more processors), a storage component 124 (e.g., a storage hierarchy), an input/output (I/O) component 126 (e.g., one or more I/O interfaces and/or devices), and a communications pathway 128. In general, processing component 122 executes program code, such as touch screen display program 30, which is at least partially fixed in storage component 124. While executing program code, processing component 122 can process data, which can result in reading and/or writing transformed data from/to storage component 124 and/or I/O component 126 for further processing. Pathway 128 provides a communications link between each of the components in computer system 120. I/O component 126 can comprise one or more human I/O devices, which enable a human user 112 to interact with computer system 120 and/or one or more communications devices to enable a system user 112 to communicate with computer system 210 using any type of communications link. To this extent, touch screen display program 130 can manage a set of interfaces (e.g., graphical user interface(s), application program interface, and/or the like, such as touch screen 8, FIGS. 1-2) that enable human and/or system users 112 to interact with touch screen display program 130. Further, touch screen display program 130 can manage (e.g., store, retrieve, create, manipulate, organize, present, etc.) data, such as content format data (e.g., underlying format of content, such as PDF, HTML, plain text, video format(s), etc.) 40 sensor (e.g., pressure sensor) data 42 and/or content display data 44 (e.g., display characteristics of content 14 such as size of display objects, shape, orientation etc.) using any solution.

Coupled with the computing system 120 is a sensor 150, which can be further coupled with touch screen 8. The sensor 150 can include, in various embodiments, a conventional pressure sensor configured to detect pressure on various locations on the touch screen 8. That is, when sensor 150 includes a pressure sensor, sensor 150 can detect pressure on one or more locations on the touch screen 8, and relay sensor data 42 (e.g., including location of pressure, duration, intensity, etc.) to computer system 120 so that touch screen display program 130 can determine whether and how to align content 14 (via content display data) on touch screen 8. In some other embodiments, the sensor 150 can include a conventional light sensor which detects the presence of shadows or light-related obstructions on the touch screen 8. Based upon the presence of shadows (as indicated by sensor data 42), the touch screen display program 130 may provide content display data 44 to the touch screen 8 to realign the content 14 on touch screen 8. It is further understood that sensor 150 can include a plurality of distinct sensors, and need not be a single sensor. Additionally, in some embodiments, sensor 150 can include at least one optical sensor such as a camera, which can detect the presence of an obstruction proximate touch screen 8. In various embodiments, where sensor 150 includes an optical sensor, the sensor 150 can detect the presence of user 112, as well as the point of view of user 112, and provide that information (as sensor data 42) to computer system 120 in order to aid in adjusting of the display of content 14.

In any event, computer system 120 (including touch screen display program 30) can obtain content format data (e.g., underlying format of content, such as PDF, HTML, plain text, video format(s), etc.) 40 sensor (e.g., pressure sensor) data 42 and/or content display data 44 (e.g., display characteristics of content 14 such as size of display objects, shape, orientation etc.), using any solution.

Computer system 120 can comprise one or more general purpose computing articles of manufacture (e.g., computing devices) capable of executing program code, such as touch screen display program 130, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, touch screen display program 130 can be embodied as any combination of system software and/or application software.

Further, touch screen display program 130 can be implemented using a set of modules 132. In this case, a module 132 can enable computer system 120 to perform a set of tasks used by touch screen display program 130, and can be separately developed and/or implemented apart from other portions of touch screen display program 30. As used herein, the term "component" means any configuration of hardware, with or without software, which implements the functionality described in conjunction therewith using any solution, while the term "module" means program code that enables a computer system 120 to implement the actions described in conjunction therewith using any solution. When fixed in a storage component 124 of a computer system 120 that includes a processing component 122, a module is a substantial portion of a component that implements the actions. Regardless, it is understood that two or more components, modules, and/or systems may share some/all of their respective hardware and/or software. Further, it is understood that some of the functionality discussed herein may not be implemented or additional functionality may be included as part of computer system 120.

When computer system 120 comprises multiple computing devices, each computing device can have only a portion of touch screen display program 130 fixed thereon (e.g., one or more modules 132). However, it is understood that computer system 120 and touch screen display program 130 are only representative of various possible equivalent computer systems that may perform a process described herein. To this extent, in other embodiments, the functionality provided by computer system 120 and touch screen display program 30 can be at least partially implemented by one or more computing devices that include any combination of general and/or specific purpose hardware with or without program code. In each embodiment, the hardware and program code, if included, can be created using standard engineering and programming techniques, respectively.

Regardless, when computer system 120 includes multiple computing devices, the computing devices can communicate over any type of communications link. Further, while performing a process described herein, computer system 120 can communicate with one or more other computer systems using any type of communications link. In either case, the communications link can comprise any combination of various types of optical fiber, wired, and/or wireless links; comprise any combination of one or more types of networks; and/or utilize any combination of various types of transmission techniques and protocols.

Figure 4:
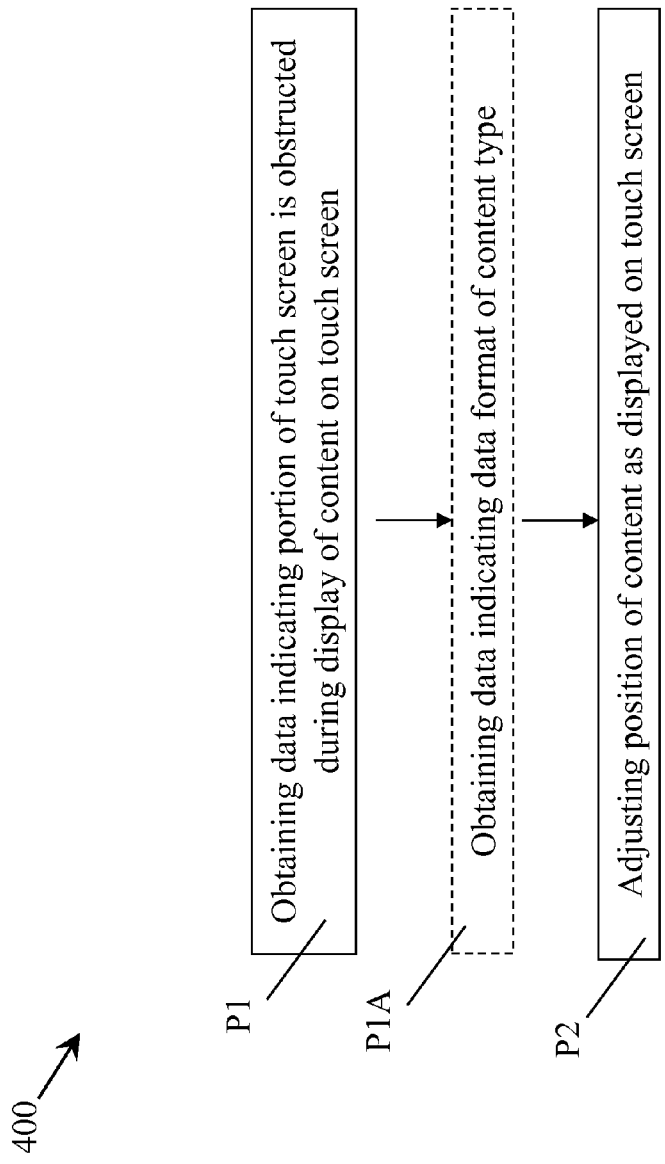
FIG. 4 shows a flow diagram illustrating processes according to various embodiments of the disclosure.

As discussed herein, the touch screen display program 130 enables computer system 20 to display content on touch screen 8 according to the various embodiments of the disclosure. Turning to FIG. 4, a schematic data flow diagram 400 illustrating functions performed by the touch screen display program 130 is shown according to various embodiments of the invention. According to various embodiments, and with continuing reference to FIGS. 1-2, the touch screen display program 130 can perform actions including:

Process P1: obtaining data (e.g., sensor data 42) indicating a portion 16 of the touch screen 8 is obstructed (e.g., contacted in various embodiments) during display of the content 14 on the touch screen 8; and Process P2: adjusting a position of the content 14 as displayed on the touch screen 8 in response to obtaining the data (e.g., sensor data 42) indicating the portion 16 of the touch screen 8 is obstructed (or, in particular cases, contacted, as described herein).

In some embodiments, contemporaneous with, prior to, or subsequent to Process P1, Process P1A (optional, in some embodiments, as indicated in phantom) can include: obtaining data (content format data 40) indicating a data format of the content type. In these embodiments, Process P2 (adjusting) can include performing the adjusting of the position of the content 14 on the touch screen 8 based upon the data format (content format data 40) of the content type.

As described herein the sensor data 42 can indicate a location of the obstruction on the touch screen 8. In various embodiments, the sensor data 42 can indicate a location (point) of contact (e.g., obstruction portion(s) 16) on the touch screen 8, e.g., where an object such as a portion of a user's hand (e.g., hand 4, FIGS. 1-2) or a device holder 6 is contacting the touch screen 8. Additionally, or alternatively, the sensor data 42 can also indicate a shape and/or a size of the contact point (point of contact) between the obstruction (e.g., hand 4 and/or holding device 6) and the touch screen 8. In various embodiments, the process of adjusting (Process P2) can include shifting a portion of the content 14 displayed proximate the location of obstructed portion 16 of the contact to a new location (unobstructed portion 18) on the touch screen 8. In some cases, the process of adjusting the position of the content 14 includes calculating an area of the touch screen 8 not obstructed (e.g., a total area of unobstructed portion 18), and allocating display of an entirety of the content 14 within the area of the touch screen not obstructed (unobstructed portion 18).

Figure 5:
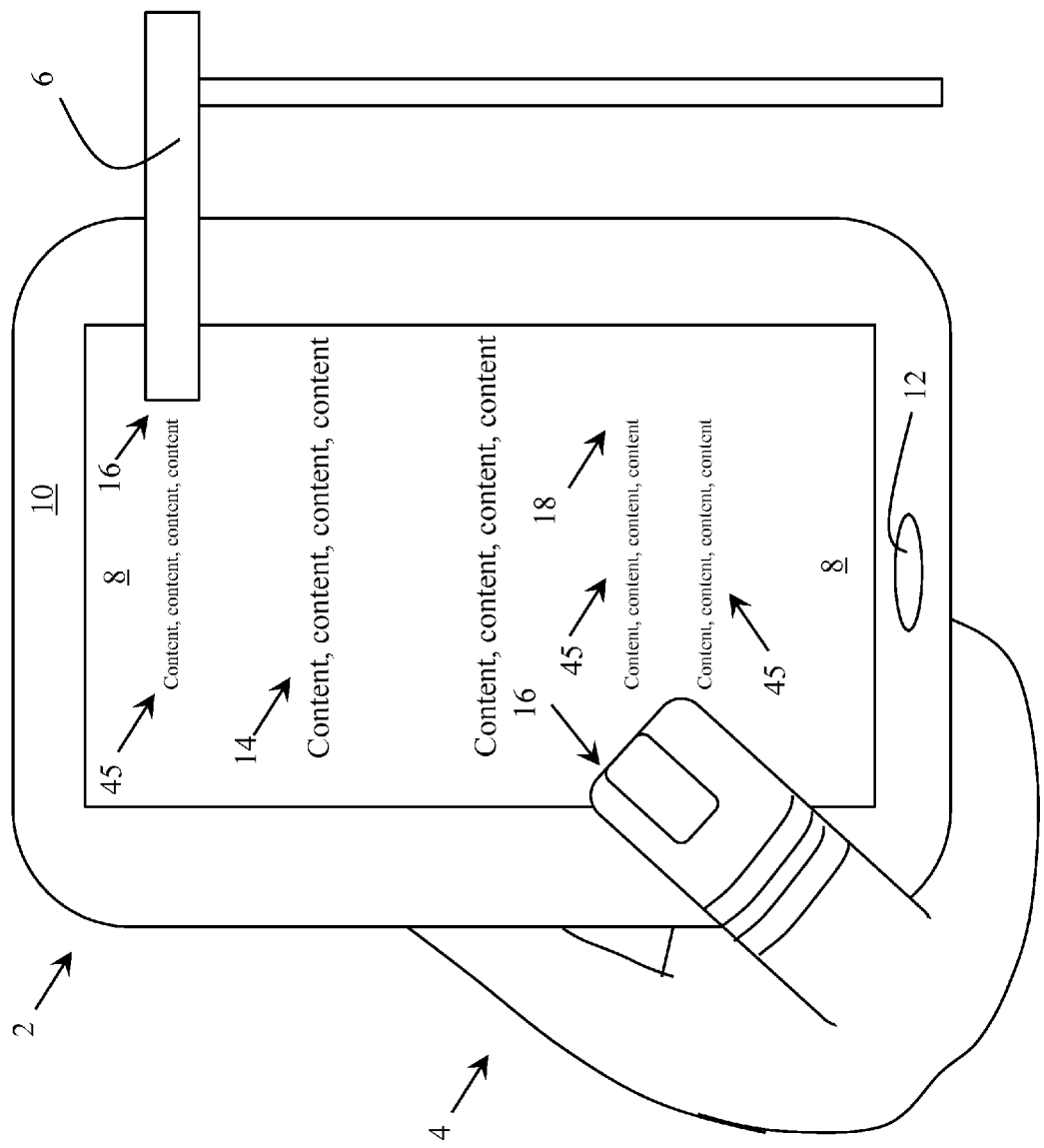
FIG. 5 shows a schematic depiction of the touch screen device of FIG. 1, with display altered according to various additional embodiments of the disclosure.

In various embodiments, the content format data 40 indicates that the data format of the content 14 cannot be reformatted (e.g., as in the case of a PDF document). In these embodiments, the adjusting (process P2) can include zooming in on one or more portions of the content 14 or zooming out from one or more portions of the content 14. FIG. 5 shows a schematic illustration of the approach for content that cannot be reformatted (e.g., PDF), where portions of the content 14 are shown in a zoom-out display 45.

In additional embodiments, for example, where the content format data 40 indicates that the data format of content 14 is text and can be reformatted, the adjusting (process P2) can include adjusting a font size (and/or type) of the content 14 in order to make the content 14 viewable (e.g., to move content 14 from obstructed portion 16). In some cases, the user 112 can configure the font size (and/or type) adjustment (e.g., as a setting option) such that a default font is displayed (e.g., Times New Roman, size 12), and when adjusting includes adjusting a font size (and/or type) of the content 14, the font size is reduced, for example, by ten, twenty, etc. percent (e.g., to size 11, size 10 or size 9 font, in Arial, Calibri, etc.) such that the content 14 is shifted away from the obstructed portion 16. In various embodiments, font size adjustment may be performed in conjunction with shifting of the content 14.

Figure 6:
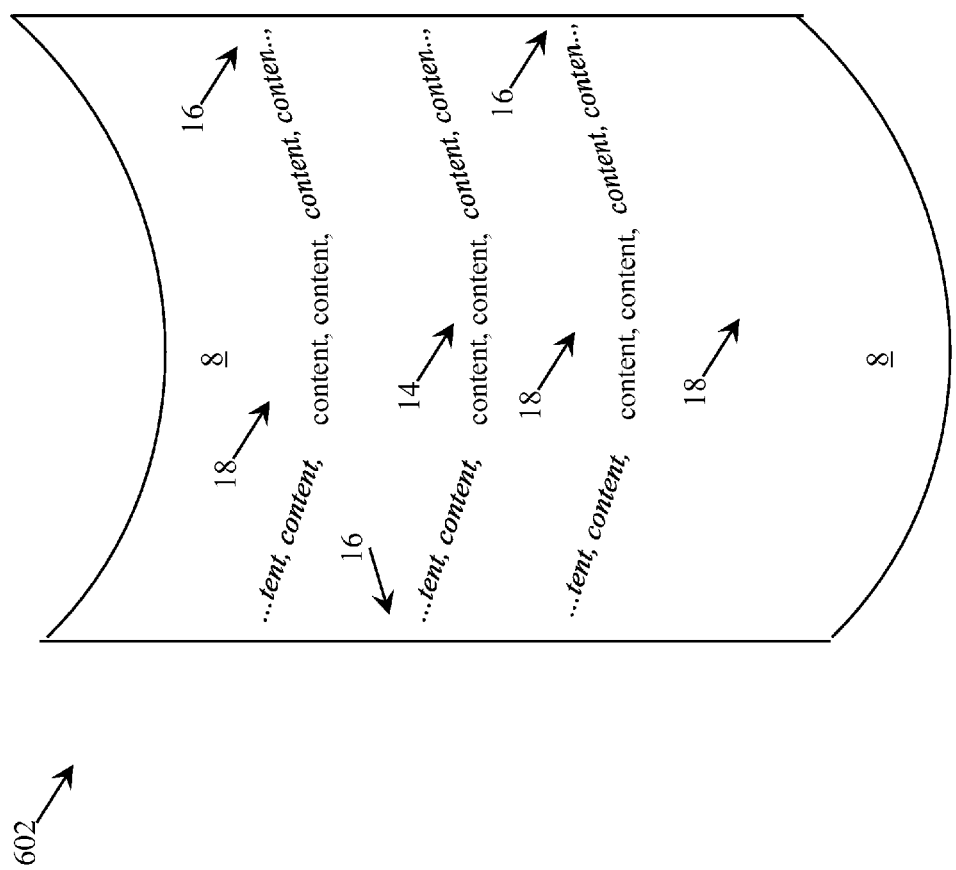
FIG. 6 shows a schematic depiction of a flexible display touch screen device according to various embodiments of the disclosure.
Figure 7:
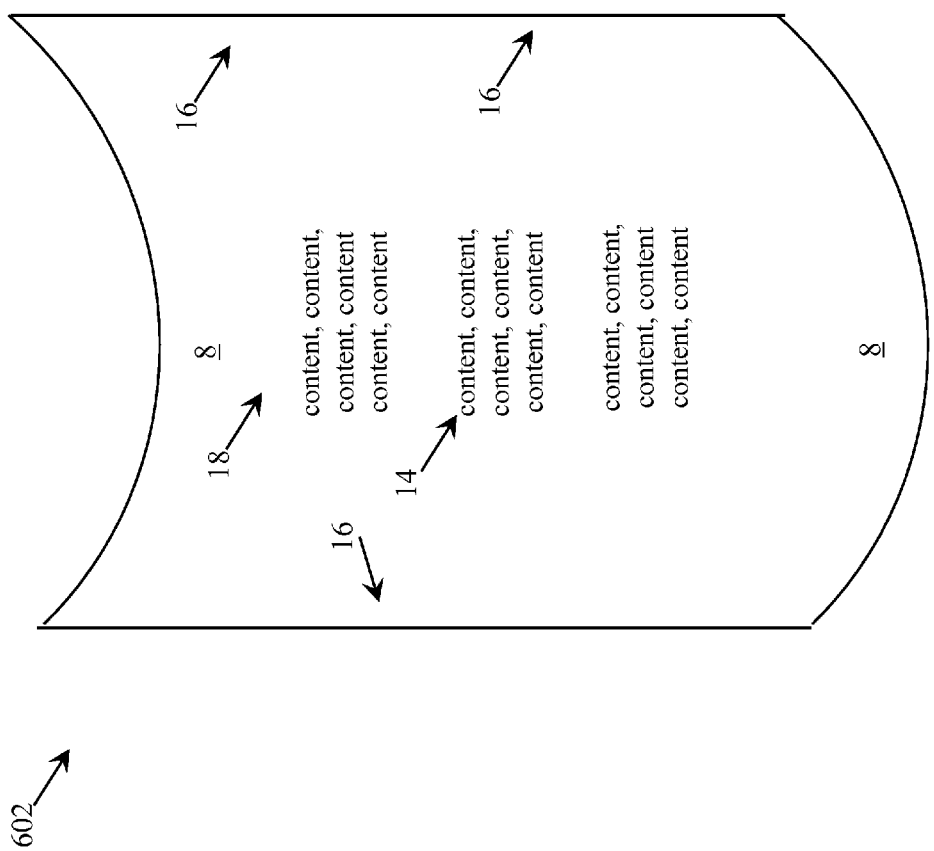
FIG. 7 shows a schematic depiction of the touch screen device of FIG. 6, with display altered according to various embodiments of the disclosure.

FIG. 6 shows an additional schematic depiction of a touch screen device 602, which can include a flexible touch screen device such as a flexible display, electronic paper, etc. The touch screen device 602 can include a touch screen 8, displaying content 14. As shown, according to various embodiments, the touch screen 8 is a flexible display, which is shown in flexion in this example depiction. As is evident in FIG. 6, a portion 16 of the touch screen is obstructed during display of the content 14, such that a portion of the content 14 is difficult to view. This portion 16 of the touch screen 8 is in flexion relative to a remainder of the touch screen, and can affect display of the content 14 from one or more viewing angles. FIG. 7 demonstrates how touch screen display program 130, in response to determining that the portion 16 of the touch screen is obstructed due to flexion of the touch screen 8, shifts the content 14 to a portion 18 of the touch screen 8 unobstructed by the flexion. In various embodiments, with continuing reference to FIG. 3, sensor 150 can detect an amount of flexion in the touch screen 8 (e.g., via one or more sensors), and the touch screen display program 130 can dynamically update the position of content 14 based upon the amount of flexion in the touch screen 8. For example, if the touch screen 8 is in less than a threshold percentage (e.g., 3%, 5%, etc.) flexion, the touch screen display program 130 may not modify the content display data 44 to shift the content 14 on touch screen 8. However, if the touch screen 8, or a portion of touch screen 8 is in greater than the threshold percentage flexion, the touch screen display program 130 may modify content display data 44 to shift the content to a portion 18 of the touch screen 8 unobstructed by the flexion.

In various embodiments, for example, where sensor 150 includes at least one optical sensor such as a camera (for detecting the presence of an obstruction proximate touch screen 8), sensor 150 can detect the presence of user 112, as well as the point of view of user 112, and provide that information (as sensor data 42) to computer system 120 in order to aid in adjusting of the display of content 14. In various embodiments, the optical sensor (sensor 150) can include conventional facial/eye tracking capability to determine a position of the eye or other portion of the face of user 112, and provide that information (as sensor data 42) to computer system 120. As described herein, computer system 120 can adjust the position/size/font of content 14 in the case that the position of the user 112 indicates that a portion of the content 14 is obstructed (or likely obstructed) from the user 112.

While shown and described herein as a method and system for displaying content on a touch screen, it is understood that aspects of the invention further provide various alternative embodiments. For example, in one embodiment, the invention provides a computer program fixed in at least one computer-readable medium, which when executed, enables a computer system to display content on a touch screen. To this extent, the computer-readable medium includes program code, such as touch screen display program 130 (FIG. 3), which enables a computer system to implement some or all of a process described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; and/or the like.

In another embodiment, the invention provides a method of providing a copy of program code, such as touch screen display program 130 (FIG. 3), which enables a computer system to implement some or all of a process described herein. In this case, a computer system can process a copy of the program code to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of the program code, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of generating a touch screen display program. In this case, a computer system, such as computer system 120 (FIG. 3), can be obtained (e.g., created, maintained, made available, etc.) and one or more components for performing a process described herein can be obtained (e.g., created, purchased, used, modified, etc.) and deployed to the computer system. To this extent, the deployment can comprise one or more of: (1) installing program code on a computing device; (2) adding one or more computing and/or I/O devices to the computer system; (3) incorporating and/or modifying the computer system to enable it to perform a process described herein; and/or the like.

It is understood that aspects of the invention can be implemented as part of a business method that performs a process described herein on a subscription, advertising, and/or fee basis. That is, a service provider could offer to an automatic question generator tool as described herein. In this case, the service provider can manage (e.g., create, maintain, support, etc.) a computer system, such as computer system 120 (FIG. 3), that performs a process described herein for one or more customers. In return, the service provider can receive payment from the customer(s) under a subscription and/or fee agreement, receive payment from the sale of advertising to one or more third parties, and/or the like.

In various embodiments, components described as being "coupled" to one another can be joined along one or more interfaces. In some embodiments, these interfaces can include junctions between distinct components, and in other cases, these interfaces can include a solidly and/or integrally formed interconnection. That is, in some cases, components that are "coupled" to one another can be simultaneously formed to define a single continuous member. However, in other embodiments, these coupled components can be formed as separate members and be subsequently joined through known processes (e.g., soldering, fastening, ultrasonic welding, bonding). In various embodiments, electronic components described as being "coupled" can be linked via conventional hard-wired and/or wireless means such that these electronic components can communicate data with one another.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A system comprising:
    a flexible touch screen device;
    a sensor connected with the flexible touch screen device, wherein the sensor includes at least one optical sensor configured to detect the presence of a user of the flexible touch screen device and a point of view of the user; and
    at least one computing device connected with the flexible touch screen device and the sensor, the at least one computing device configured to display content on a touch screen of the flexible touch screen device by performing actions including:
        obtaining data indicating a portion of the touch screen is obstructed during display of the content on the touch screen, wherein the portion of the touch screen obstructed during display of the content is obstructed due to flexion of the flexible touch screen device; and
        adjusting a position of the content as displayed on the touch screen in response to obtaining the data indicating the portion of the touch screen is obstructed, wherein the adjusting of the position of the content as displayed on the touch screen includes shifting the content to a portion of the touch screen unobstructed by the flexion, wherein the shifting includes temporarily moving the content to the portion of the screen unobstructed by the flexion, the point of view of the user determining the portion of the touch screen unobstructed by flexion.

2. The system of claim 1, wherein the sensor is configured to detect an amount of the flexion in the touch screen.

3. The system of claim 2, wherein the at least one computing device is further configured to dynamically update the position of the content based upon the amount of flexion in the touch screen.

4. The system of claim 3, wherein, if the flexion in the touch screen is less than a threshold percentage flexion, the at least one computing device does not adjust the position of the content as displayed on the touch screen.

\* \* \* \* \*